US007462389B2

(12) United States Patent
Egawa

(10) Patent No.: US 7,462,389 B2
(45) Date of Patent: Dec. 9, 2008

(54) TRANSFER BELT AND IMAGE FORMING APPARATUS

(75) Inventor: Noriaki Egawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 156 days.

(21) Appl. No.: 11/444,689

(22) Filed: Jun. 1, 2006

(65) Prior Publication Data

US 2006/0275570 A1 Dec. 7, 2006

(30) Foreign Application Priority Data

Jun. 1, 2005 (JP) ............................ 2005-160822

(51) Int. Cl.

| | |
|---|---|
| ***B32B 5/16*** | (2006.01) |
| ***B32B 27/00*** | (2006.01) |
| ***G03G 15/16*** | (2006.01) |
| ***G03G 15/01*** | (2006.01) |
| ***G03G 15/20*** | (2006.01) |

(52) U.S. Cl. ....................... 428/328; 428/500; 399/297; 399/302; 399/308; 399/313

(58) Field of Classification Search ....................... None
See application file for complete search history.

(56) References Cited

U.S. PATENT DOCUMENTS

| | | | | |
|---|---|---|---|---|
| 5,525,446 | A * | 6/1996 | Sypula et al. | .............. 430/47.4 |
| 6,078,773 | A | 6/2000 | Shimojo et al. | |

FOREIGN PATENT DOCUMENTS

| | | | |
|---|---|---|---|
| EP | 0 859 292 | A2 | 8/1998 |
| JP | 8-202064 | A | 8/1996 |
| JP | 2001-042654 | A | 2/2001 |
| JP | 2002-287528 | A | 10/2002 |

OTHER PUBLICATIONS

Relevant portion of European Search Report of corresponding European Application 06010782.8-2209.

* cited by examiner

*Primary Examiner*—Sheeba Ahmed
(74) *Attorney, Agent, or Firm*—Rossi, Kimms & McDowell LLP

(57) ABSTRACT

A transfer belt composed of a single layer or a plurality of layers is disclosed in which the single layer or the outermost layer of the layers constituting the transfer belt is a layer formed from a polymer composition. The polymer composition contains particles having an average particle diameter of 20 nm or less and a refractive index of 2.3 or more with respect to light of 800 nm in wavelength. The transfer belt has a surface roughness having a maximum height Rz of 0.3 μm or less according to JIS B 0601, 2001.

3 Claims, 2 Drawing Sheets

TRANSFER BELT AND IMAGE FORMING APPARATUS

BACKGROUND OF THE INVENTION

1. Field of the Invention

The present invention relates to a belt used for transfer, i.e., a transfer belt such as a transfer material transport belt or an intermediate transfer belt, used in image forming apparatus such as electrophotographic apparatus. The present invention also relates to an image forming apparatus having the transfer belt.

2. Related Background Art

As conventional image forming apparatus, image forming apparatus (electrophotographic apparatus) are well known which employ such an electrophotographic system as described below.

First, the surface of an electrophotographic photosensitive member as an image bearing member is charged, and this surface is then irradiated with exposure light (image exposure light) to form an electrostatic latent image on the surface of the electrophotographic photosensitive member. Next, the electrostatic latent image is developed with a toner to form a toner image on the surface of the electrophotographic photosensitive member, and then the toner image is transferred to a transfer material toner image is transferred to the transfer material, the transfer material is transported by a transfer material transport belt to the position of transfer.

As a system by which the toner image held on the surface of the electrophotographic photosensitive member is transferred to the transfer material, an intermediate transfer system is also well known in which the toner image held on the surface of the electrophotographic photosensitive member is primarily transferred to the surface of an intermediate transfer belt and the toner image on the surface of the intermediate transfer belt is further secondarily transferred to the transfer material.

In the image forming apparatus using transfer belts such as the transfer material transport belt and the intermediate transfer belt, as a method by which the density and position of toner images are detected, a method is employed in some cases in which toner patches are formed on the surface of the transfer belt and the toner patches are detected with a photosensor. This method utilizes the reflection of light from the surface of the transfer belt, and hence the surface of the transfer belt is required to have a high light reflectance.

In the case where this detection method is employed, cleaning (belt cleaning) is required by toner such as the toner scattered when the toner patches are formed are removed from the transfer belt.

Inasmuch as it is advantageous that it is unnecessary to separately prepare any of the members for belt cleaning, in the cleaning of the transfer material transport belt, a method is largely employed in which the residual toner is transferred from the transfer material transport belt to the electrophotographic photosensitive member and then collected in a residual-toner container for the electrophotographic photosensitive member.

In this belt cleaning method, in many cases the transfer material transport belt and the electrophotographic photosensitive member are rotated allowing their peripheral speeds to differ from each other so as to improve cleaning efficiency. However, if the transfer material transport belt and the electrophotographic photosensitive member come into close contact with each other so as to produce a great difference between the static friction coefficient and the dynamic friction coefficient, stick-slip may occur to destabilizing the rotation of, and contact between, the transfer material transport belt and the electrophotographic photosensitive member, so that the cleaning efficiency is not improved. belt, it is also necessary to remove, in addition to the above residual toner, the remaining toner that was not transferred at the time of secondary transfer (secondary transfer residual toner). Accordingly, a method is largely employed in which the toner remaining on the intermediate transfer belt is scraped off and removed with a blade.

In this belt cleaning method, if the intermediate transfer belt and the blade come into close contact with each other, stick-slip may occur or the blade may turn over, thereby lowering cleaning efficiency.

That is, there is a requirement that the surface of the transfer belt, which includes the transfer material transport belt and the intermediate transfer belt, must have friction characteristics and close-contact properties which should be held within preferable ranges.

To resolve this problem, e.g., Japanese Patent Application Laid-open No. H08-202064 discloses a technique in which resin particles of fluorine resin, silicone resin or the like are incorporated into the transfer belt. Also, Japanese Patent Application Laid-open No. 2002-287528 discloses a transfer belt whose friction coefficient and surface roughness are specified. control the transfer belt to have friction coefficient at a certain level or less, it is necessary to use in the surface layer of the transfer belt a resin having small surface energy, or to roughen the surface of the transfer belt.

However, in the above background art, the surface of the transfer belt may have low reflectance when satisfying friction characteristics and close-contact properties. Specifically, since fluorine resin and silicone resin have a low refractive index, the surface of the transfer belt incorporated with any of these tends to have low reflectance. In addition, when incorporating resin particles, voids may occur at the surface of the transfer belt. Such voids cause a lowering of the reflectance of the surface of the transfer belt. Furthermore, if the surface of the transfer belt is roughened, a problem is raised in that diffused reflection increases which is a noise component in the method of detecting the density and position of toner images with a photosensor.

SUMMARY OF THE INVENTION

An object of the present invention is to provide a transfer belt achieving both i) friction characteristics and close-contact properties that effectively kept from occurring and ii) high reflectance that enables the density and position of toner images to be accurately detected with a photosensor, and an image forming apparatus having such a transfer belt.

That is, the present invention is a transfer belt including a single layer or a plurality of layers, wherein the single layer or a surface layer positioned on the outermost surface side of the layers constituting the transfer belt is a layer formed from a polymer composition containing particles which have an average particle diameter of 20 nm or less and a refractive index of 2.3 or more with respect to light of 800 nm in wavelength; and the transfer belt has a surface roughness having a maximum height Rz of 0.3 μm or less according to JIS B 0601, 2001.

The present invention is also an image forming apparatus having the above transfer belt.

DESCRIPTION OF THE PREFERRED EMBODIMENTS

In the above method of detecting the density and position of toner images with a photosensor, light with wavelengths in the near infrared region (wavelength: 700 to 2,500 nm) or in the visible light region is often used as the light emitted from the photosensor. In particular, light with wavelengths in the near infrared region is largely used. Accordingly, the surface of the transfer belt is required to have high reflectance with respect to the light with wavelengths in any of these regions.

Hence, the particles used in the surface layer of the transfer belt of the present invention should have a refractive index of 2.3 or more with respect to light of 800 nm in wavelength. The refractive index of particles herein refers to the refractive index of the material the particles are made from. Thus, the "particles having a refractive index of 2.3 or more with respect to light of 800 nm in wavelength" refer to particles made from a material having a refractive index of 2.3 or more with respect to light of 800 nm in wavelength. transfer belt of the present invention should have an average particle diameter of 20 nm or less. If the particles used in the surface layer of the transfer belt and a binder material (a polymeric material) for the surface layer are poor in uniformity, diffused reflection may increase. In the present invention, the average particle diameter of the particles is a value found by observing the sections of the particles with a TEM (transmission electron microscope) and averaging their primary particle diameters by number.

The transfer belt of the present invention has a surface roughness having a maximum height Rz of more than 0 μm to 0.3 μm or less according to JIS B 0601, 2001, because diffused reflection may increase if the surface of the transfer belt has a large roughness. In the present invention, the surface roughness of the transfer belt is measured using a feeler surface profile analyzer (SURFCORDER SE-30C) manufactured by Kosaka Laboratory Ltd. (reference length: 0.25 mm; evaluation length: 1.25 mm).

As to the particles used in the surface layer of the transfer belt of the present invention, there are no particular limitations as long as the above conditions are satisfied, and any known particles may be used. Titanium oxide particles are preferred, as stably providing particles of 20 nm or less on the average and being relatively inexpensive. From the viewpoint of the stability of particles, the particles used in the surface layer of the transfer belt of the present invention preferably have an average particle diameter of 5 nm or more.

Figure 1:
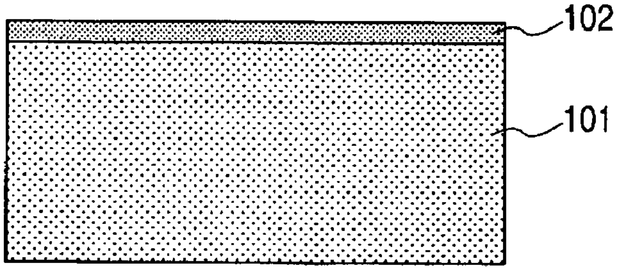
FIG. 1 is a view showing the layer constitution of a transfer belt.

The transfer belt of the present invention may be composed of a single layer, or a plurality of layers. It is preferable that the transfer belt of the present invention is composed of a plurality of layers inclusive of the surface layer incorporated with the particles, because the flexing resistance of the transfer belt may be reduced when the surface layer is incorporated with the above particles. Specifically, it is preferable that the transfer belt is constituted of two layers consisting of a base layer 101 and a surface layer 102 as shown in FIG. 1.

In the case where the transfer belt is constituted of a plurality of layers, the polymeric material used as a binder material for the surface layer is required not to be causative of any cracking or abrasion even if the transfer belt slips when it is driven, and is required to be durable for long-term service. As a binder material (polymeric material) which satisfies these properties and which can easily form the surface layer on the underlying acrylic resin or an acrylic urethane resin.

Materials (binder materials) used in the layer(s) other than the surface layer in the case where the transfer belt is constituted of a plurality of layers and in the single layer in the case where the transfer belt is constituted of a single layer may include, e.g., polyethylene, polypropylene, polymethylpentene, polystyrene, polyamide, polycarbonate, polyvinylidene fluoride, polysulfone, polyarylate, polyethylene terephthalate, polybutylene terephthalate, polyphenylene sulfide, polyether sulfone, polyether nitrile, thermoplastic polyimides, polyether ether ketone, thermotropic liquid-crystal polymers, non-thermoplastic polyimides and aromatic polyamides.

In order to reproduce preferable images by means of the image forming apparatus using a transfer belt, the transfer belt is required to have suitable conductivity. In order to provide the transfer belt with conductivity, it is prevalent to add a conductive filler. As the conductive filler, known fillers of various types may be used. Specifically, the following is usable: carbon type fillers such as carbon black, carbon fiber and graphite powder, metal type conductive fillers and metal oxide type conductive fillers.

Present Invention are Described Below.

Figure 2:
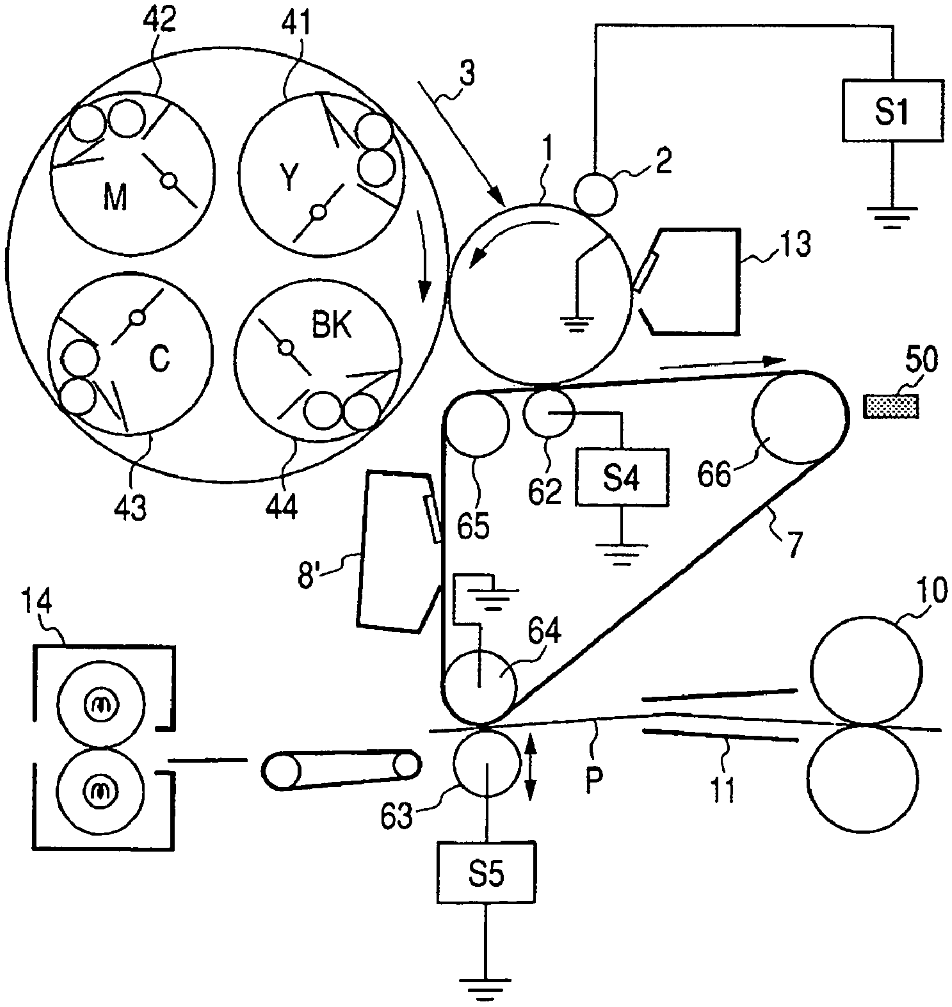
FIG. 2 illustrates an image forming apparatus (an electrophotographic apparatus) using the transfer

FIG. 2 is a schematic illustration of an image forming apparatus (electrophotographic apparatus) using the transfer belt of the present invention as an intermediate transfer belt.

In FIG. 2, reference numeral 1 denotes a drum-shaped electrophotographic photosensitive member (hereinafter referred to also as a "photosensitive drum"), which is rotatively driven at a stated peripheral speed in the direction of an arrow. The photosensitive drum 1 is, in the course of its rotation, charged in a stated polarity and stated potential by means of a primary charging assembly 2, and then imagewise exposed to exposure light 3 emitted from an image exposure unit (not shown). Letter symbol S1 denotes a power source of the primary charging assembly. Thus, an electrostatic latent image is formed which corresponds to a first color component image (e.g., a yellow toner image) of the intended color image.

Next, the electrostatic latent image formed is developed by means of a first developing assembly 41 (yellow Y developing assembly) into the first-color component image (yellow toner image). At this stage, second, third and fourth developing assemblies, i.e., a magenta M developing assembly 42, a cyan C assembly 44 each stand unoperated and do not act on the photosensitive drum 1. Hence, the first-color yellow component image is not affected by the magenta developing assembly 42, cyan developing assembly 43 and black developing assembly 44.

An intermediate transfer belt 7 is fitted over and around a group of rollers 64, 65 and 66, and is so disposed as to come into contact with the photosensitive drum 1 and is rotatively driven at the same peripheral speed as the photosensitive drum 1. While the first-color yellow toner image formed on the photosensitive drum 1 passes through a nip zone formed between the photosensitive drum 1 and the intermediate transfer belt 7, it is primarily transferred to the surface of the intermediate transfer belt 7. This primary transfer is performed by the aid of an electric field produced by a primary transfer bias (with a polarity opposite to the polarity of the toner) applied from a bias power source S4 to a primary transfer roller 62.

Yellow toner not primarily transferred and remaining on the photosensitive drum 1 is subjected to cleaning by means of a cleaning assembly 13. Subsequently, the second-color magenta toner image, the third-color cyan toner image and the fourth-color black toner image are sequentially transferred Thus, synthesized color toner images corresponding to the intended full-color image are formed.

The synthesized color toner images transferred to the intermediate transfer belt 7 are secondarily transferred to a transfer material P. More specifically, the transfer material P coming from a cassette (not shown) passes through a transfer material feed roller 10 and a transfer material guide 11 and is fed to a nip zone formed between the intermediate transfer belt 7 and a secondary transfer roller 63. At the same time, a secondary transfer bias is applied to the secondary transfer roller 63 from a bias power source S5, and the synthesized color toner images held on the intermediate transfer belt 7 are secondarily transferred to the transfer material P. The transfer material P to which the synthesized color toner images have been transferred are guided into a fixing assembly 14, where the synthesized color toner images are fixed to the transfer material P. Thus, the intended full-color image is formed.

Toners having remained on the intermediate transfer belt 7 are collected by means of a cleaning assembly 8'.

Figure 3:
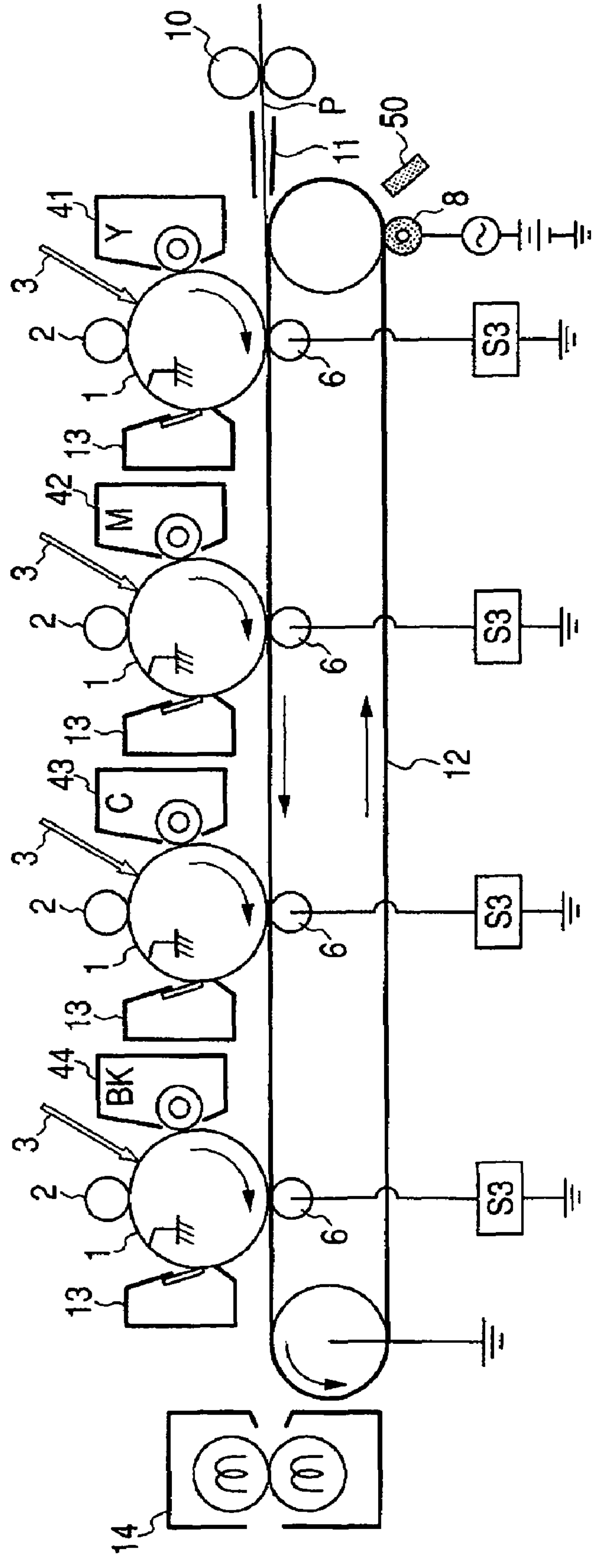
FIG. 3 illustrates an image forming apparatus (an electrophotographic apparatus) using the transfer belt as a transfer material transport belt.

FIG. 3 is a schematic illustration of an image forming apparatus (electrophotographic apparatus) transfer material transport belt 12.

In FIG. 3, four photosensitive drums 1 for forming respective color toner images are set and each of the photosensitive drums is so disposed as to form a nip with a transfer material transport belt 12. A transfer material P coming from a cassette (not shown) passes a transfer material feed roller 10 and a transfer material guide 11 and is fed onto the transfer material transport belt 12. Then, the transfer material P is held on the transfer material transport belt 12, transported successively, and passes through a nip formed between each photosensitive drum 1 and the transfer material transport belt 12, when respective-color toner images formed on the photosensitive drum 1 are superimposed and transferred onto the transfer material P. Such processes as in the image forming apparatus of FIG. 2 are repeated until the respective-color toner images are formed on the photosensitive drum 1. Reference numeral 6 denotes a transfer bias applying means, and letter symbol S3 denotes a power source thereof. Four color toner images are superimposed and transferred, and the transfer material P on which synthesized color toner images corresponding to the intended full-color image have been formed is guided into a fixing assembly 14, where the synthesized color toner the full-color image is formed.

Toner remaining on the transfer material transport belt 12 is charged by means of a charging assembly 8, and then transferred to the photosensitive drum 1 at the nip zone formed between the photosensitive drum 1 and the transfer material transport belt 12, and collected by means of the cleaning assembly 13.

In either case of the image forming apparatus shown in FIGS. 2 and 3, as for the controlling of the density of toner images, respective-color toner patches are formed on the transfer material transport belt 7 or the transfer material transport belt 12, and this density is detected with a sensor 50. Then, the results of the detection are fed back to process conditions such as applied voltage and laser power, whereby the maximum density, halftone gradation characteristics, etc. of respective-color toner images are adjusted. The controlling of the position of toner images also is performed in the same manner as in the controlling of the density.

EXAMPLES

The present invention is described below in greater detail by giving specific working examples which should not be construed to limit the present invention. In the following, "part(s)" refers to

Example 1

To polyvinylidene fluoride (available from KUREHA CORPORATION), 10% by mass of KETJEN BLACK EC600 (trade name; available from Lion Corporation) particles were added, and kneaded. The resulting composition was extruded into a sheet to produce a sheet of 100 μm in thickness. Both ends of this sheet were joined together to form it into a cylindrical shape (in the form of an endless belt). This was used as a base layer of a transfer belt.

As methods for forming the sheet into a cylindrical shape, any methods may be used as long as both ends thereof can be joined together to such an extent that a difference in height at the joint has no influence on the intended use and the joint formed is strong enough to withstand the intended use. For example, as a method by which a sheet-like plastic (plastic sheet) is formed into a cylindrical shape, Japanese Patent Application Laid-open No. H07-205274 discloses a method in which only both ends of the sheet are fused. In addition, Japanese Patent No. 3441860 discloses a method in which a sheet-like plastic (plastic sheet) is positioned between two cylindrical forms (inner form and outer form) having different coefficients of thermal expansion, so as for both ends to be substantially put together, and produce an endless belt. In the present Example, the base layer of the transfer belt was obtained by utilizing the method disclosed in Japanese Patent No. 3441860.

Next, a surface layer material prepared by dissolving the following polymer composition for forming the surface layer in 100 parts of methyl isobutyl ketone (solvent) was applied onto the base layer by slit coating, and irradiated with ultraviolet light to form a surface layer of 1 μm in thickness.

polymer composition for forming surface layer:

| | |
|---|---|
| Ultraviolet-curable acrylic resin (available from JSR Corporation) | 100 parts |
| Titanium oxide particles (average particle diameter: 20 nm; available from Catalysts & Chemicals Industries Co., Ltd.) | 50 parts |

Thus, a transfer belt composed of the base layer and the surface layer was produced.

The transfer belt thus produced had a surface roughness having a maximum height Rz of 0.2 μm according to JIS B 0601, 2001.

Example 2

A transfer belt was produced in the same manner as in Example 1 except that in Example 1, the amount of the titanium oxide particles used in the polymer from 50 parts to 25 parts.

The transfer belt thus produced had a surface roughness having a maximum height Rz of 0.2 μm according to JIS B 0601, 2001.

Comparative Example 1

A transfer belt was produced in the same manner as in Example 1 except that in Example 1, 50 parts of the titanium oxide particles used in the polymer composition for forming the surface layer were changed to 50 parts of zinc antimonate particles (average particle diameter: 20 nm; available from Nissan Chemical Industries, Ltd.).

The transfer belt thus produced had a surface roughness having a maximum height Rz of 0.2 μm according to JIS B 0601, 2001.

Comparative Example 2

A transfer belt was produced in the same manner as in Comparative Example 1 except that in Comparative Example 1, the amount of the zinc antimonate particles used in the polymer composition for forming the surface layer was changed from 50 parts to 25 parts.

The transfer belt thus produced had a surface roughness having a maximum height Rz of 0.2 μm according to JIS B 0601, 2001.

Comparative Example 3 as in Example 1 except that in Example 1, 50 parts of the titanium oxide particles used in the polymer composition for forming the surface layer were changed to 50 parts of fluorine resin particles (average particle diameter: 20 nm; available from Hoechst Japan Ltd.).

The transfer belt thus produced had a surface roughness having a maximum height Rz of 0.2 μm according to JIS B 0601, 2001.

Comparative Example 4

A transfer belt was produced in the same manner as in Comparative Example 3 except that in Comparative Example 3, the amount of the fluorine resin particles used in the polymer composition for forming the surface layer was changed from 50 parts to 25 parts.

The transfer belt thus produced had a surface roughness having a maximum height Rz of 0.3 μm according to JIS B 0601, 2001.

Comparative Example 5

A transfer belt was produced in the same manner as in Example 1 except that in Example 1, 50 parts of the titanium oxide particles used in the polymer composition for forming the surface layer were changed to 50 parts of silicone resin particles (average particle diameter: 20 nm; available from Dow The transfer belt thus produced had a surface roughness having a maximum height Rz of 0.3 μm according to JIS B 0601, 2001.

Comparative Example 6

A transfer belt was produced in the same manner as in Comparative Example 5 except that in Comparative Example 5, the amount of the silicone resin particles used in the polymer composition for forming the surface layer was changed from 50 parts to 25 parts.

The transfer belt thus produced had a surface roughness having a maximum height Rz of 0.3 μm according to JIS B 0601, 2001.

Evaluation 1:

The transfer belts of Examples 1 and 2 and Comparative Examples 1 to 6 were examined to ascertain whether the stick-slip occurred, and the reflectance with respect to light of 800 nm in wavelength was measured. The results are shown in Table 1. In addition, the reflectance of each transfer belt is a value found when specular reflection at an incident angle of 5 degrees is measured with a spectrophotometer (trade name: U4000; manufactured by Hitachi Ltd.).

TABLE 1

| Particles for | Example | | Comparative Example | | | | | |
|---|---|---|---|---|---|---|---|---|
| surface layer | 1 | 2 | 1 | 2 | 3 | 4 | 5 | 6 |
| Type: | Titanium oxide particles | | Zinc antimonate particles | | Fluorine resin particles | | Silicone resin particles | |
| Refractive index: | 2.30 | 2.30 | 1.70 | 1.70 | 1.34 | 1.34 | 1.39 | 1.39 |
| Average particle diameter: | 20 nm | 20 nm | 20 nm | 20 nm | 20 nm | 20 nm | 20 nm | 20 nm |
| Amount (parts): | 50 | 25 | 50 | 25 | 50 | 25 | 50 | 25 |
| Reflectance of transfer belt surface: | 6.5% | 5.3% | 4.3% | 4.1% | 2.7% | 3.0% | 3.0% | 3.2% |
| Stick-slip: | no | no | no | yes | no | no | no | no |

As being clear from Table 1, the transfer belts of Examples 1 and 2 were able to achieve both i) friction characteristics and close-contact properties that are good enough to keep the stick-slip from occurring and ii) a high reflectance, at high levels.

Example 3

A transfer belt was produced in the same manner

The transfer belt thus produced had a surface roughness having a maximum height Rz of 0.2 μm according to JIS B 0601, 2001.

Comparative Example 7

A transfer belt was produced in the same manner as in Example 3 except that in Example 3, the titanium oxide particles used in the polymer composition for forming the surface layer, having an average particle diameter of 20 nm, were changed to those having an average particle diameter in the range of from 30 to 50 nm (available from Ishihara Sangyo Kaisha, Ltd.).

The transfer belt thus produced had a surface roughness having a maximum height Rz of 0.3 μm according to JIS B 0601, 2001.

Comparative Example 8

A transfer belt was produced in the same manner as in Example 3 except that in Example 3, the titanium oxide particles used in the polymer composition for forming the surface layer, having an average particle diameter of 20 nm, were changed for those having an average particle diameter in the range of from 50 to 90 nm (available from Ishihara Sangyo Kaisha, Ltd.).

The transfer belt thus produced had a surface roughness having a maximum height Rz of 0.3 μm Evaluation 2:

The transfer belts of Example 3 and Comparative Examples 7 and 8 were examined to ascertain whether the stick-slip occurred, and to determine the precision of position detection with a photosensor using light of 800 nm in wavelength. The results are shown in Table 2.

TABLE 2

| Particles for surface layer | Example 3 | Comparative Example 7 | Comparative Example 8 |
|---|---|---|---|
| Type: | Titanium oxide particles | | |
| Refractive index: | 2.30 | 2.30 | 2.30 |
| Average particle diameter: | 20 nm | 30–50 nm | 50–90 nm |
| Amount: | 50 parts | 50 parts | 50 parts |
| Stick-slip: | no | no | no |
| Position detection precision: | Good | Inferior to Example 3 | Inferior to Comp. Example 7 |

As the average particle diameter of the particles used in the surface layer decreased, noise components were reduced, and the precision of position detection was improved.

Example 4

A transfer belt was produced in the same manner as in Example 1.

The transfer belt thus produced had a surface roughness having a maximum height Rz of 0.2 μm according to JIS B 0601, 2001.

Example 5

A transfer belt was produced in the same manner as in Example 1.

Next, the surface of the transfer belt was roughened by using wrapping paper so as to have a surface roughness having a maximum height Rz of 0.3 μm according to JIS B 0601, 2001.

Comparative Example 9

A transfer belt was produced in the same manner as in Example 1.

Next, the surface of the transfer belt was roughened by using wrapping paper so as to have a surface roughness having a maximum height Rz of 0.4 μm according to JIS B 0601, 2001.

Comparative Example 10

A transfer belt was produced in the same manner as in Example 1.

Next, the surface of the transfer belt was roughened by using wrapping paper so as to have a μm according to JIS B 0601, 2001.

Evaluation 3:

The transfer belts of Examples 4 and 5 and Comparative Examples 9 and 10 were examined to ascertain whether the stick-slip-occurred, and to determine the precision of position detection with a photosensor using light of 800 nm in wavelength. The results are shown in Table 3.

TABLE 3

| Particles for surface layer | Example 4 | Example 5 | Comparative Example 9 | Comparative Example 10 |
|---|---|---|---|---|
| Type: | Titanium oxide particles | | | |
| Refractive index: | 2.30 | 2.30 | 2.30 | 2.30 |
| Average particle diameter: | 20 nm | 20 nm | 20 nm | 20 nm |
| Amount: | 50 parts | 50 parts | 50 parts | 50 parts |
| Surface roughness of transfer belt: | 0.2 μm | 0.3 μm | 0.4 μm | 0.5 μm |
| Stick-slip: | no | no | no | no |
| Position detection precision: | Good | Good | Inferior to Examples 4 & 5 | Inferior to Comp. Example 9 |

As the surface roughness (Rz) of the transfer belt decreased, noise components were reduced and the precision of position detection was improved.

In addition, the surface state of the surface layer changes depending on various conditions such as the dispersibility of titanium oxide particles in a solvent, the amount of the solvent, and the temperature and humidity environment at the time of coating. Here, a method was employed in which the coating was carried out under constant conditions and the surface state was controlled by using wrapping paper.

The precision of position detection with a photosensor using light of 800 nm in wavelength was determined by, in all the Examples and Comparative Examples, reproducing full-color images in an environment of temperature 23° C. and humidity 50% RH, using the intermediate transfer type image forming apparatus (electrophotographic apparatus) constituted as shown in FIG. 2.

As described above, according to the present invention, it is possible to provide a transfer belt achieving both i) friction characteristics and close-contact properties that enable the stick-slip and blade turn-over to be effectively kept from occurring and ii) high reflectance that enables the detected with a photosensor, and an image forming apparatus having such a transfer belt.

This application claims priority from Japanese Patent Application No. 2005-160822 filed on Jun. 1, 2005, which is hereby incorporated by reference herein.

What is claimed is:

1. A transfer belt comprising a single layer or a plurality of layers, wherein:

the single layer or a surface layer positioned on the outermost surface side of the plurality of layers is a layer formed from a polymer composition containing particles which have an average particle diameter of 20 nm or less and a refractive index of 2.3 or more with respect to light of 800 nm in wavelength, the transfer belt has a surface roughness having a maximum height Rz of 0.3 μm or less according to JIS B 0601, 2001, and the particles consist of titanium oxide.

2. The transfer belt according to claim 1, wherein the polymer composition contains an acrylic resin as a binder material.

3. An image forming apparatus having the transfer belt according to claim 1.

* * * * *